US007115223B2

(12) United States Patent
Pugel et al.

(10) Patent No.: US 7,115,223 B2
(45) Date of Patent: Oct. 3, 2006

(54) METHOD OF FORMING AND HEATING A COMPRESSED COMPOSITE PRODUCT

(75) Inventors: Anton D. Pugel, Boise, ID (US); Norbert Kott, Fort Langley (CA)

(73) Assignee: Weyerhaeuser Company, Federal Way, WA (US)

( * ) Notice: Subject to any disclaimer, the term of this patent is extended or adjusted under 35 U.S.C. 154(b) by 106 days.

(21) Appl. No.: 10/637,984

(22) Filed: Aug. 8, 2003

(65) Prior Publication Data

US 2005/0029699 A1 Feb. 10, 2005

(51) Int. Cl.
*B29C 43/14* (2006.01)

(52) U.S. Cl. ............................ 264/68; 264/69; 264/71; 264/120

(58) Field of Classification Search ........ 264/109–128, 264/68, 69, 70
See application file for complete search history.

(56) References Cited

U.S. PATENT DOCUMENTS 4,923,656 A * 5/1990 Held ........................... 264/70
6,312,632 B1 11/2001 Graf

FOREIGN PATENT DOCUMENTS

DE 196 02 536 A1 7/1996
WO WO 92/15447 A1 9/1992

* cited by examiner

*Primary Examiner*—Mary Lynn Theisen

(57) ABSTRACT

The present invention is a method of forming and heating a compressed composite wood product. The method includes introducing a mat assembly of resinated discrete wood elements into an oscillating compression press. Once the material is within the oscillating compression press, the compression/release oscillation is controlled to form the material. Specifically, the compression/release oscillation is controlled to heat the mat assembly to a to at least a cure temperature of the resin.

15 Claims, 13 Drawing Sheets

METHOD OF FORMING AND HEATING A COMPRESSED COMPOSITE PRODUCT

FIELD OF THE INVENTION

This invention relates generally to methods of forming compressed products and, more specifically to a method of forming a compressed composite wood product with oscillating compression.

BACKGROUND OF THE INVENTION

Oriented strand board, parallel strand lumber and other engineered wood products produced from discrete wood elements are produced in a press by depositing a mat of resin coated wood elements within the press and applying a compressive force to the mat. Heat from a variety of sources is added to substantially cure the resin while the mat is within the press. The heat may be added in the form of microwave energy, conduction, radio frequency energy, steam injection or the like.

As depicted in FIG. 1, current press systems include a pair of opposed platens 40*a* configured to continuously compress a material 38*a* into a desired shape. Adjacent each platen 40*a* is a press belt 37 running on a roller arrangement 35. The belt 37 and roller arrangement 35 combination allows movement of the material 38*a* through the platens 40*a* while the platens are continuously applying a compressive force to the material 38*a*. This method of forming a composite wood product is problematic in many ways.

The current continuous press designs impede the application of energy. The press belt, bearing arrangements and necessary lubrication materials represent a significant barrier for the application of heating energy to the product. The heating of the product via a hot platen technology results into an uneven heating profile.

FIG. 2 show a conventional heating profile of a hot platen press. Chart 15 reflects temperature and pressure within the material 38*b* with respect to temperature in degrees Celsius on the Y-axis 17 and time in seconds on the X-axis. This chart 15 is taken from a graduate thesis prepared by Stephen E. Johnson at Virginia Polytechnic Institute and State University, Blacksburg, Va., in August 1990. The thesis was entitled "Response of Mat Conditions and Flakeboard Properties to Steam-Injection Variables."

SUMMARY OF THE INVENTION

The present invention is a method of forming and heating a compressed composite wood product. The method includes introducing a mat assembly of resinated discrete wood elements into an oscillating compression press. Once the material is within the oscillating compression press, the compression/release oscillation is controlled to form the material. Specifically, the compression/release oscillation is controlled to heat the mat assembly to a to at least a cure temperature of the resin.

It is postulated that heating is accomplished by the compounding energy deposition resulting from the hysteresis energy loss of each compression/release oscillation. This phenomenon is not fully understood.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention provides a system and method for forming and heating a compressed material product using an oscillating compression pressing process. By way of overview, and with references to FIG. 3, one presently preferred embodiment includes a compressed material forming system 20. The compressed material forming system 20 includes a material forming and temperature control system 24 used to control the temperature of the material 38*b* and the material's densification during the forming process. A material transport system 26 is included to move the material through the compressed material forming system 20 as desired. Additionally, a material treatment system 28 is optionally present to treat the material 38*b* during the forming process. Specific details of the compressed material forming system 20 are described with more particularity below.

Figure 4:
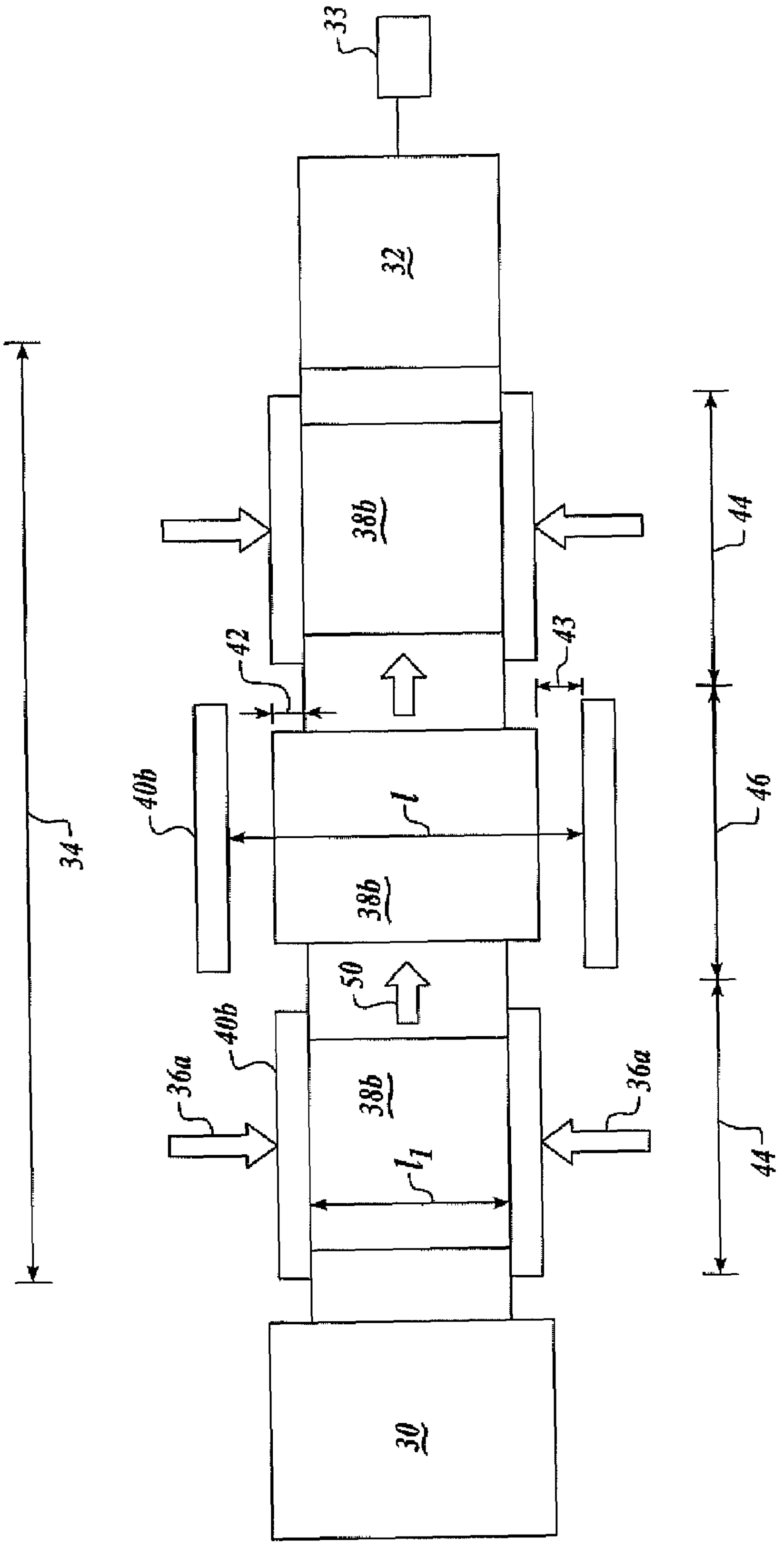
FIG. 4 is a schematic of the oscillating pressing process according to an aspect of the present invention.

The material 38*b* to be subjected to the treatment of the invention desirably comprise a mat assembly 30 (FIG. 4) of resinated discrete wood elements which can be subjected simultaneously to pressure and heat to form cured, consolidated wood products 32. The wood elements may be in any known form. Suitable, non-limiting examples of the wood elements usable with this present invention are wood chips, flakes, strands, veneers, fibers, particles and wafers.

The products 32 (FIG. 4) preferably produced by the present invention are any known consolidated composite wood products presently known in the industry. Suitable product 32 examples include, but are not limited to particleboard, oriented strand board, fiberboard, waferboard, plywood, laminated veneer lumber, parallel strand lumber, and laminated beams.

The moisture content of the material 38*b* prior to treatment by the process of the invention generally will broadly range from about 0% to about 20% by weight. However, this moisture content range is merely a general guideline, and may be departed from. Optimum moisture content for material 38*b* is preferably determined on a case-by-case basis and determining a desired moisture content range is within the skill of the art to correlate moisture levels with mat assembly 30 dimensions in order to make such determinations. It is possible to treat material 38*b* having a moisture content approaching zero, but the limited plasticity of wood under such conditions make this less desirable. The moisture content may be augmented by employing a water-containing adhesive.

The resin may be any adhesive whose rate of cure is accelerated by the application of heat. Water-soluble and non-water-soluble alkaline and acidic phenolic resins, resorcinol-formaldehyde resins, urea-formaldehyde resins, and isocyanate resins, for example, can be employed. The resin may be applied to material 38*b* in any desired amount. When employing long wood strands, the resin solids content will often range from about 1 to about 10% of the oven dry weight of the wood. Most often, the resin will be applied in an amount ranging from about 1% to about 5% of the dry weight of the wood.

The material forming and temperature control system 24 is configured to control the temperature of the material 38*b*. Specifically, the material forming and temperature control system 24 controls the motion of the platens 40*b*, both stroke and frequency, such that material 38*b* is heated by the compounding energy deposition resulting from the hysteresis energy loss of each compression/release oscillation cycle caused by the oscillating motion of platen 40*b*. No external heating source is required to bring the material 38*b* up to a desired temperature, such as, without limitation, a resin cure temperature. Those skilled in the art will appreciate that heat generated within the material 38*b* by the compounding energy deposition resulting from the hysteresis energy loss of each compression/release oscillation will be substantially uniform across the entire cross section of the material 38*b*. Further aspects of the present invention are discussed in more detail below.

The material forming and temperature control system 24 may use a variety of known structures to induce the oscillating motion of the platens 40*b* and such structures are not intended to limit the scope of the present invention. For example, the oscillation may be induced by a controller 27 (FIG. 10) configured to actuate a pneumatic or hydraulic actuated cylinder (not shown). Likewise, the controller 27 may be configured to operate a suitable electromagnetic drive mechanism to induce the oscillating motion. The controller 27 may be configured to control an eccentric shaft or the like, described in more detail below, to induce the oscillating motion of the platens 40*b*. Suitable controllers 27 are known in the art, and as such a detailed description is not included herein.

The controller 27 is suitably arranged to perform in a number of acceptable manners. For example, in one embodiment, it is performed by a processor or microprocessor (not shown) arranged to perform suitable operations. Any processor known in the art is acceptable, without limitation, a Pentium®-series processor available from Intel Corporation or the like. Alternatively, control of the platens 40*b* is performed by an electronic computer chip, hydraulic control systems, or is performed manually. Accordingly, the scope of the present invention shall not be limited by the manner in which the oscillating motion is generated.

FIGS. 4–9 illustrate various aspects of an oscillating compression press cycle 34 of the material forming system 20. The present invention is usable in a continuous press or batch type press operation. Specifically, these FIGURES show the relative motion of the platens 40*b* and the material 38*b*. In accordance with the present invention, a single oscillating compression press cycle 34 includes one full compression phase 44 and one full release phase 46. The compression phase 44 is the phase of the oscillating compression press cycle 34 wherein the platens 40*b* are moving in a direction toward one another. Conversely, the release phase 46 is the phase of the oscillating compression press cycle 34 wherein the platens 40*b* are moving in a direction away from one another.

Figure 9:
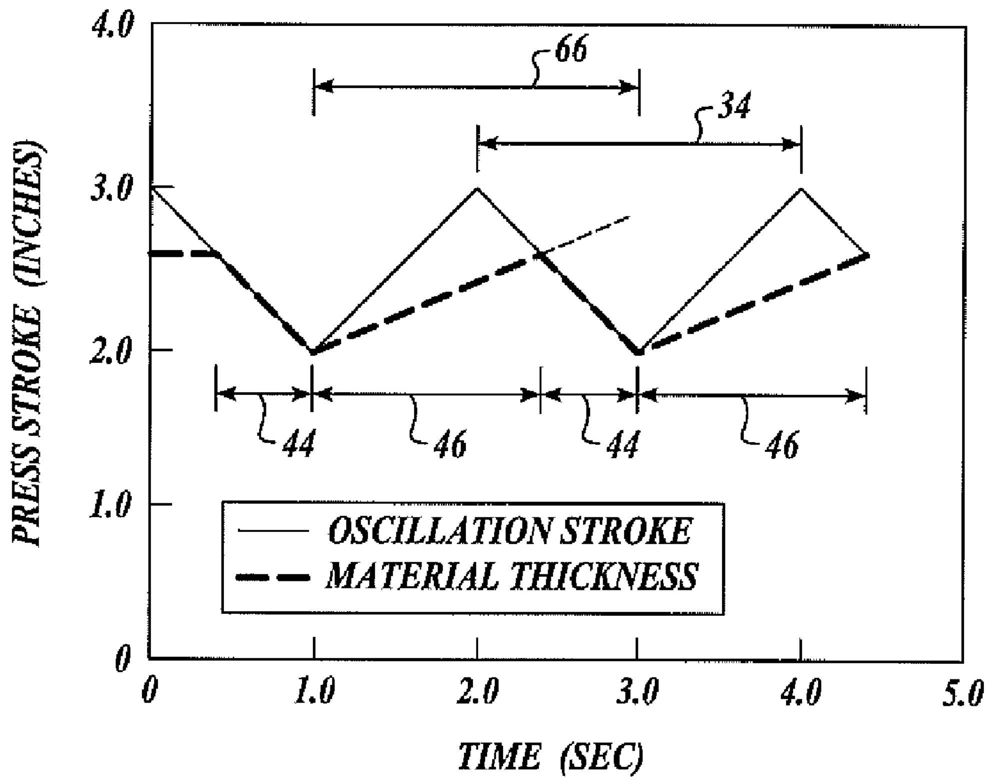
FIG. 9 is a graphical illustration of the relation between press stroke and material thickness over time in accordance with the present invention.

FIGS. 4–6 and 9 depict an aspect of the present invention. Specifically, the oscillating compression press cycle 34 is suitably arranged such that during the release phase 46 the material 38 is completely free from press applied compressive forces. More specifically, after the compression phase 44, at least one of the platens 40*b* is moved away from the material 38*b* at a rate that is faster than the rate at which the material 38*b* is expanding upon release of the compressive forces. During the release phase 46, the material 38*b* will expand due to the residual stress induced by the compression. The amount of time required for the material 38*b* to expand to substantially a uncompressed dimension is the compression recovery response time 66 (FIG. 9). More specifically, at least one platen 40*b* is suitably controlled to release the material 38*b* and subsequently recompress the material 38*b* in less time than the material's compression recovery response time 66. Those skilled in the art will appreciate that a variety of factors affect the material's compression recovery response time 66. For example, without limitation, material dimension, material composition, resin cure state, the amount of compression applied to the material 38*b*, and the size of the desired elastic region 42 are all factors having an affect on the compression recovery response time 66. As such, the determination of a suitable compression recovery response time 66 for a given material is preferably determined through experimentation by those skilled in the art.

Figure 7:
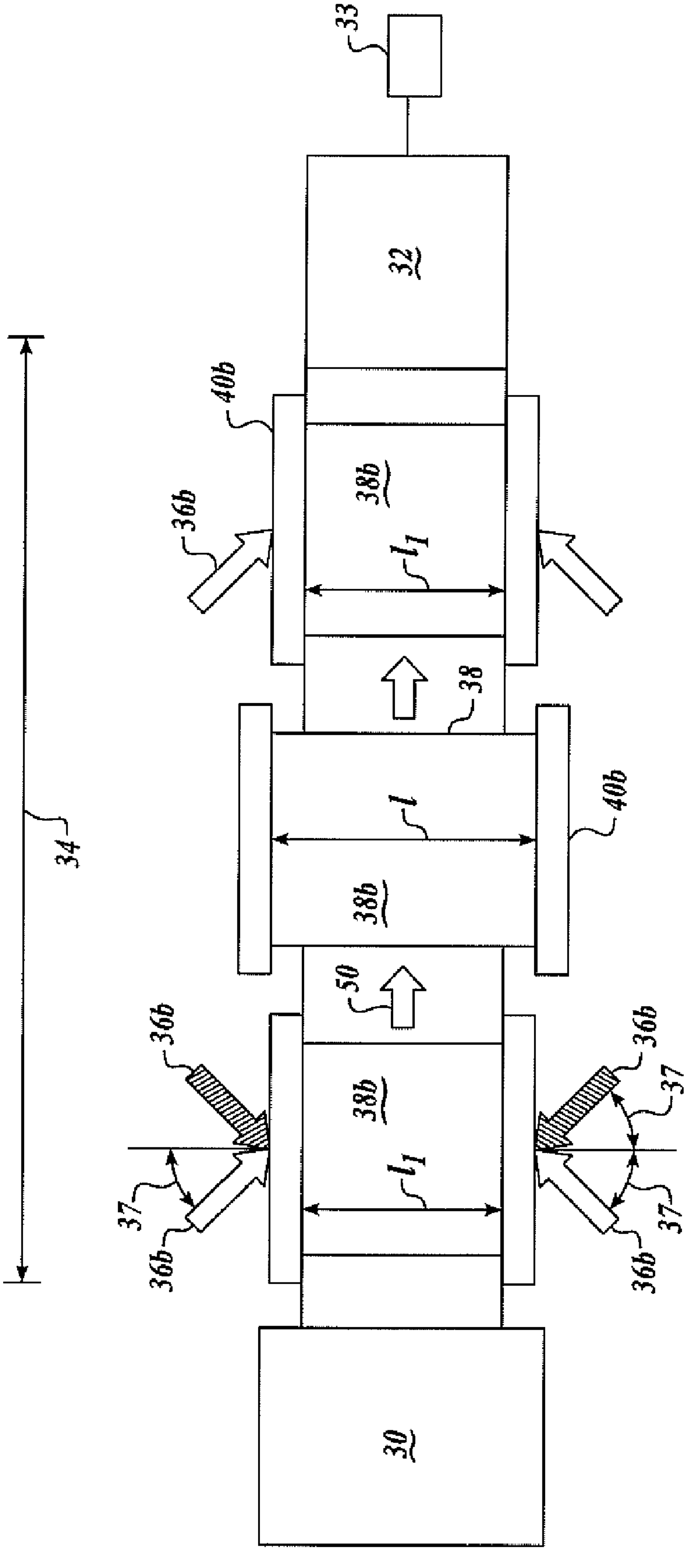
FIG. 7 is yet another schematic of a further aspect of the oscillating pressing process according to an aspect of the present invention.
Figure 8:
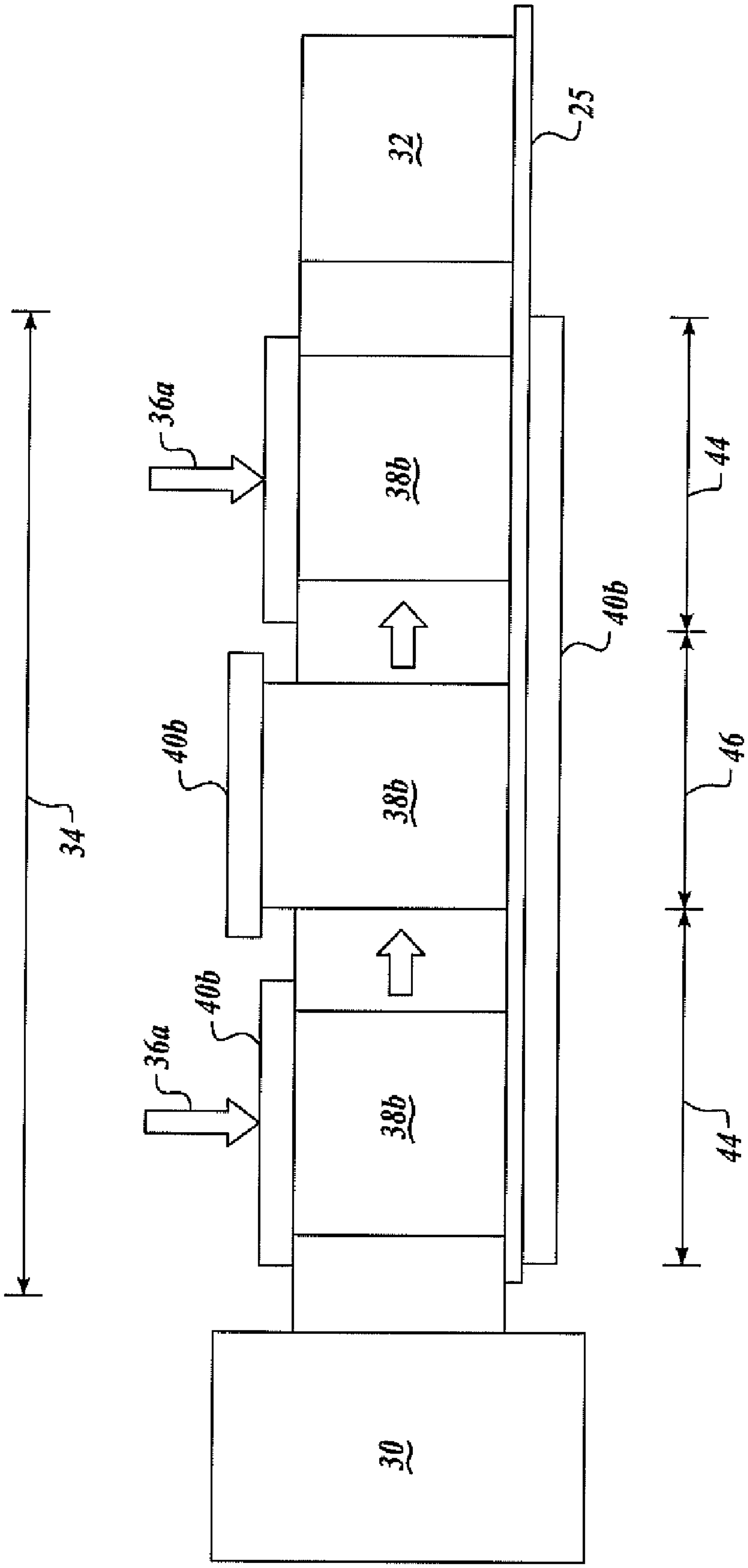
FIG. 8 is yet another schematic of a further aspect of the oscillating pressing process according to an aspect of the present invention.

FIGS. 7 and 8 illustrate an additional aspect of the present invention. Here, the platens 40*b* are substantially continuously in contact with the material 38*b*. This is accomplished by controller 27 driving at least one of the platens 40*b* away from the material 38 at a rate substantially equal to or less than the compression recovery response time 66. Thus, in this mode, the platens 40*b* are substantially continuously in contact with the material 38*b* such that release phase 46 involves a decreasing compressive force exerted on the material 38*b* by the platens 40*b*. This aspect of the invention may be used, for example, with a batch type production process.

Although the scope of the present invention is not intended to be limited by the range of frequencies for the release phase 46, a preferably range of frequencies has been found to achieve desirable results when used in accordance with the present invention. In a particular embodiment, the oscillating compression press cycle 34 of the present invention is preferably operated between about 1 Hz to about 400

Hz. It will be appreciated, however, that a specific frequency or range of frequencies will be dependent upon the nature of the material 38*b* being formed. As such, the specific frequency or range of frequencies optimal for a given material 38*b* is preferably determined through experimentation by those skilled in the art.

The stroke 62 of the platens 40*b* is suitably chosen to produce, among other things, a desired relief region 43 or a desired decrease in compressive force during the release phase 46. Additionally, the stroke 62 may be chosen to maximize the amount of hysteresis energy loss generated in a single compression phase 44, for example, by a relatively longer stroke. Conversely, an operator may chose to utilize a relatively short stroke if, for example, minimal time between compression phases 44 is desired. Further, the stroke 62 may be chosen purely on the nature of the material 38*b* or dimensions of the material 38*b* being formed. As such, the specific stroke optimal for a given material 38*b* is preferably determined through experimentation by those skilled in the art.

As best seen in FIGS. 4–8, the stroke 62 may also be described as a ratio or the maximum platen distance "l" in the direction of compression and the minimum platen distance "$l_1$" in the direction of compression. This compression stroke ratio is best expressed mathematically as:

compression stroke ratio:

$$\mu_c = \frac{l_1 - 1}{l}$$

Experimental data, described in more detail below, has found that a compression stroke ratio within the range of $0.01<\mu_c<0.5$ is preferable. However, it will be appreciated that a compression stroke ratio above or below this range is also within the scope of this invention. A specific compression stroke ration will be dependent upon the nature of the material 38*b* and as such is best determined experimentally.

Another aspect the material forming and temperature control system 24 is best seen in FIGS. 4–8. Specifically, compression vectors 36*a,b* depicts the resultant motion vector of the platens 40*b* at a moment in time substantially equal to the initiation of the compression phase 44. In a presently preferred embodiment, the compression vector 36*a* is substantially perpendicular to a material flow direction 50 within the oscillating pressing system 20. In this fashion, for a compressed material forming system 20 moving material 38*b* along a horizontal path, as indicated by direction arrow 50, the compression vector 36*a* is substantially vertically oriented.

Alternatively, the compression vector 36*b* is suitably at a compression vector angle 37 relative to the material flow direction 50. The compression vector angle 37 will suitably include a lateral component 39 that reflects instantaneous platen motion in a lateral direction, a direction substantially parallel to the plane of the material flow direction 50. Additionally, the compression vector angle 37 includes a vertical component 41 indicating similar motion along a vertical direction, a direction substantially perpendicular to the plane of the material flow direction 50.

Figure 5:
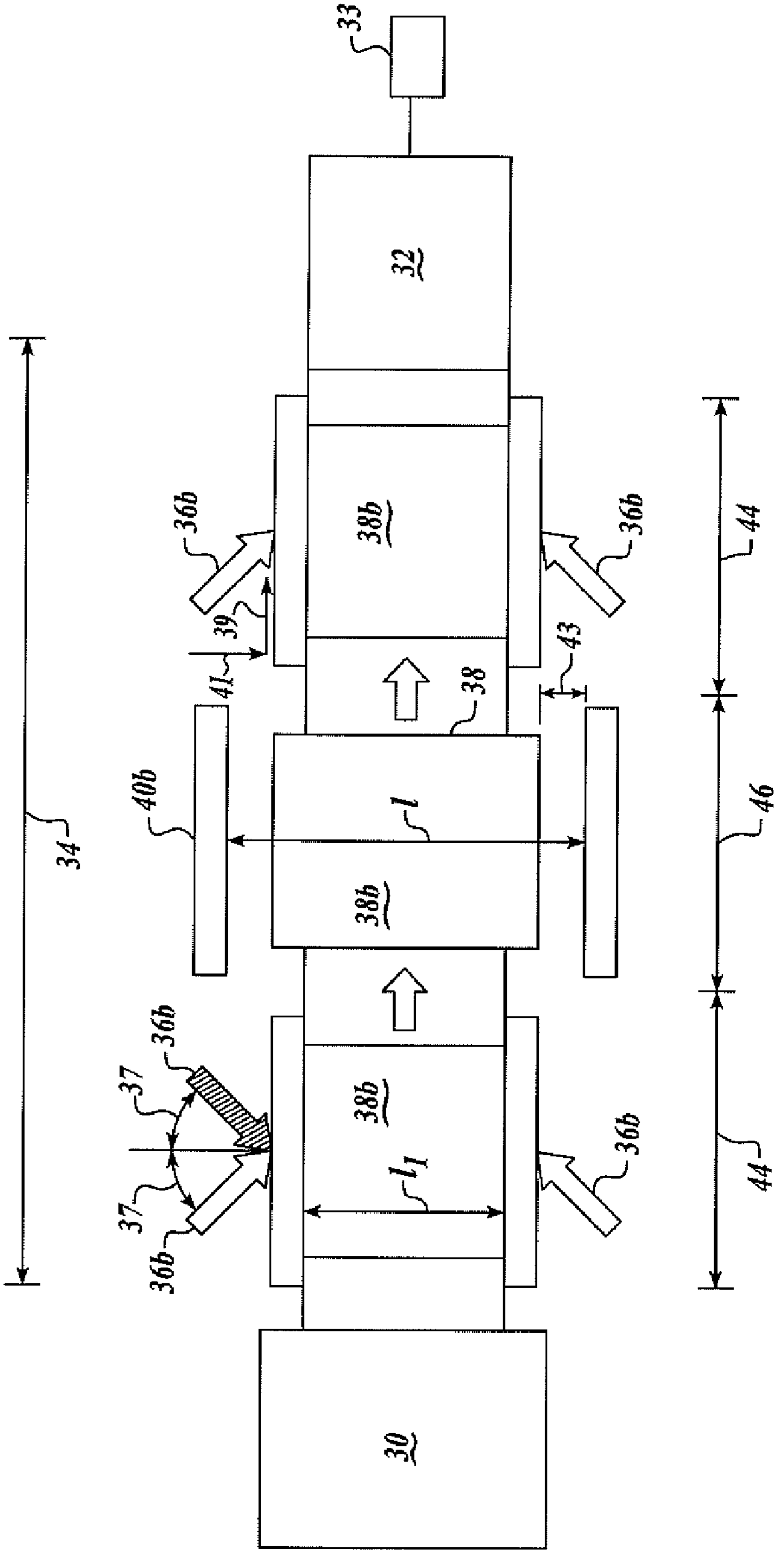
FIG. 5 is a schematic of another aspect of the oscillating pressing process according to an aspect of the present invention.
Figure 6:
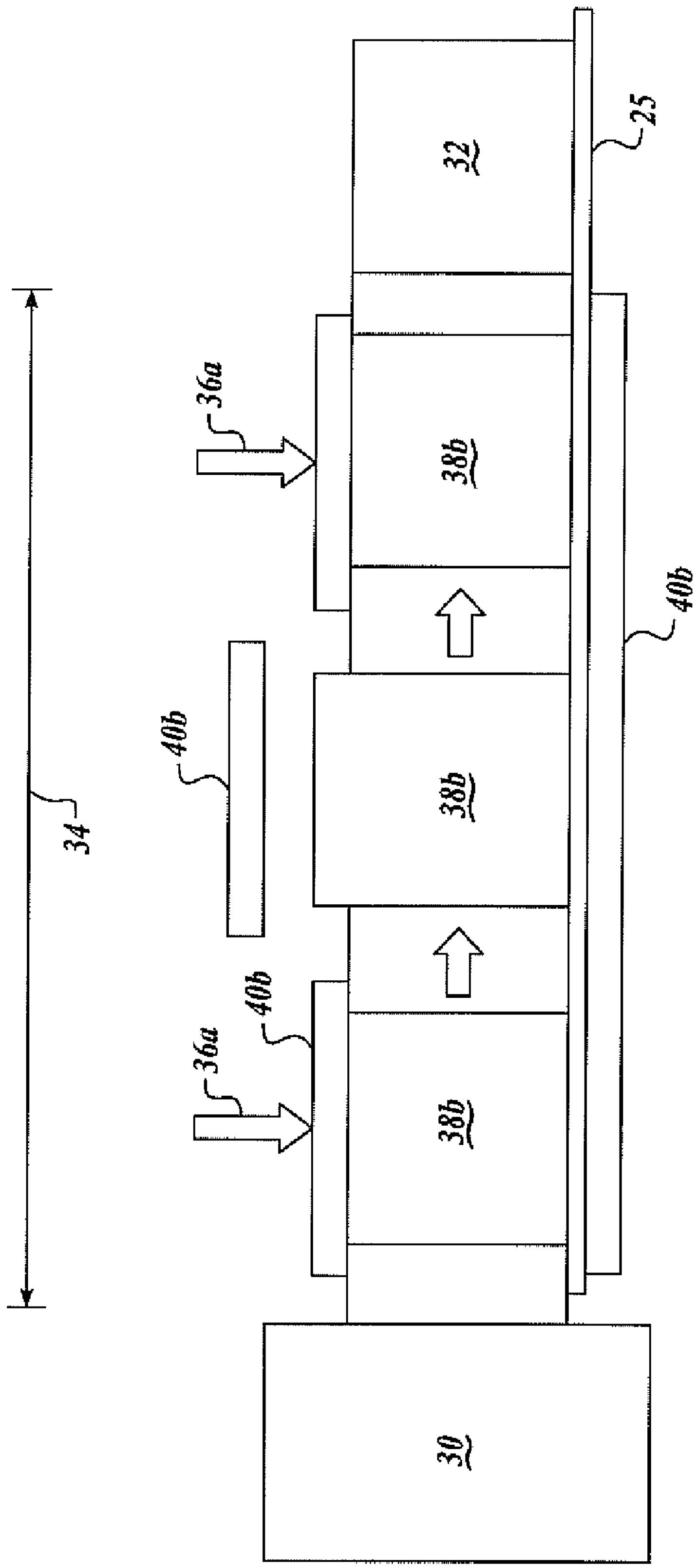
FIG. 6 is an additional schematic of another aspect of the oscillating pressing process according to an aspect of the present invention.

With reference to FIGS. 5 and 7, a compression vector angle 37 from about 5 degrees to about 85 degrees will be associated with movement of the material 38*b* in a first direction. Further, at a compression vector angle of about 95 degrees to about 175 degrees is associated with movement of the material 38*b* in a second direction, substantially opposite of the first direction.

In a presently preferred embodiment the compression vector angle 37 is within a range of about 30 degrees to about 60 degrees. However, smaller and larger compression vector angles 37 are considered within the scope of this invention. More specifically, the present invention has been found to function with a compression vector angle 37 of about 5 degrees to about 85 degrees, relative to the material flow direction 50.

Given the circular motion of the platens 40*b*, it has also been determined that a compression vector angle of about 95 degrees to about 175 degrees is also usable with the present invention. Obviously, a compression vector angle 37 within this range would result in the reversal of the material flow direction 50. More specifically, a second material flow direction 51, substantially opposite to the first material flow direction 50, is achieved. It will be appreciated by those skilled in the art, the oscillating pressing system 20 may be controlled in this manner as a means of controlling the linear feed rate of the material through the press to control heating or compression the material 38*b*. A more detailed discussion of platen motion and the resulting material transport is discussed below.

Figure 10:
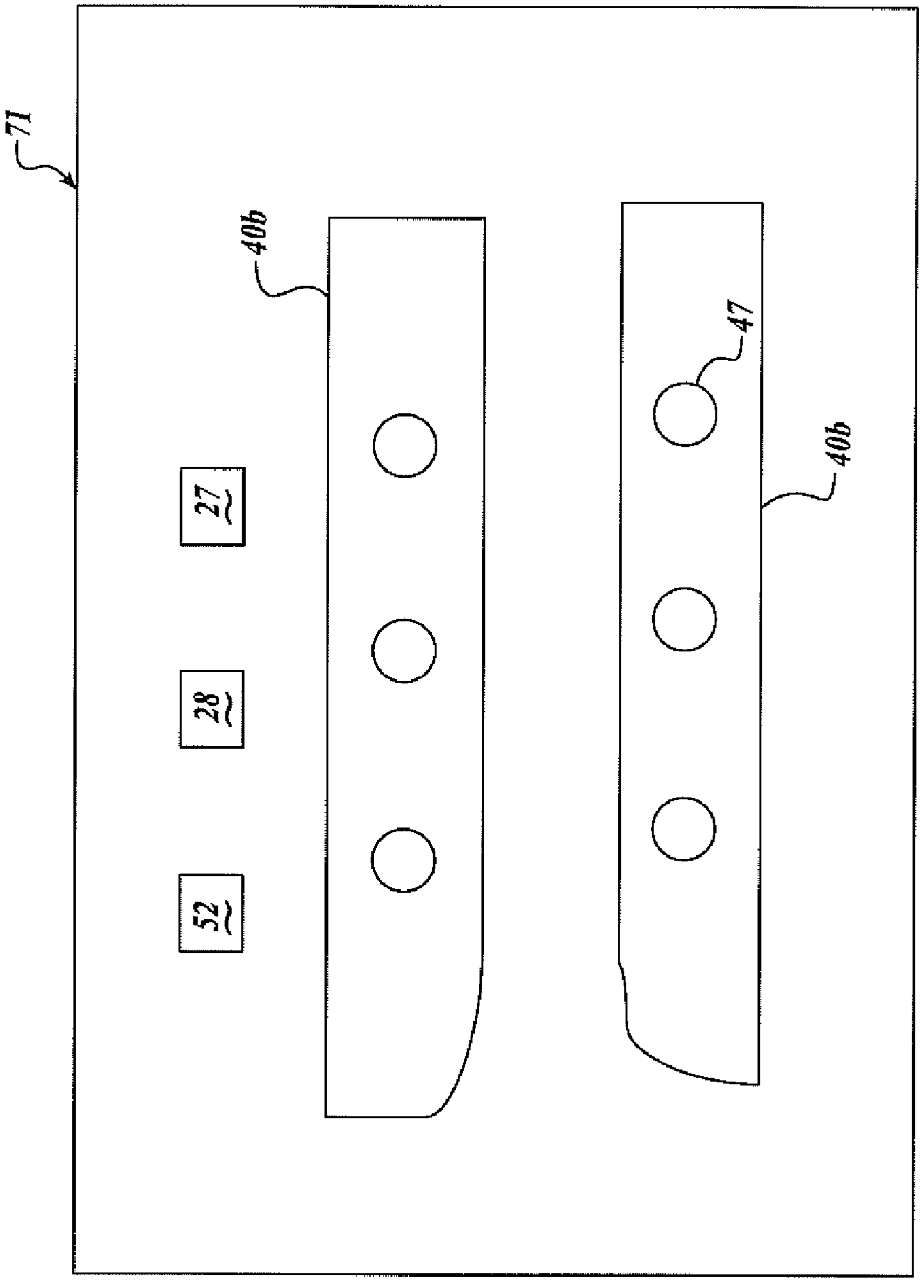
FIG. 10 is a general system diagram of oscillating compression press according to the present invention.

FIG. 10 depicts another aspect unique to the present invention. Specifically, a press system 71 according to the present invention is disclosed. The press system includes platens 40*b* configured to directly contact the material 38*b* during the pressing process. It should be noted, however, that platens 40*b* may be lined with a material, such as stainless steel (not shown), to help to assist in material 38*b* movement through the material forming system 20.

The platens 40*b* are typically metal or other material formed to include a tapered entrance section 48 configured to receive the mat assembly 30 as it enters the oscillating pressing system 20. The amount of the taper is suitably determined by those skilled in the art. However, in a particular embodiment of the present invention, a taper range of about 0.3 degrees to about 7 degrees was found to be sufficient. However, platens 40*b* with entrance regions 48 having greater, lesser or compound tapers are considered within the scope of this invention. Additionally, platens 40*b* with entrance regions 48 located at opposed ends of the platens 40*b* are also within the scope of this invention (not shown).

With respect to FIGS. 3–8 and 12, the material transport system 26 of the present invention may take various forms. Regardless of the form, those skilled in the art will appreciate the function of the material transport system 26 is to move the material 38*b* through the oscillating pressing system 20. The present invention may use any known material transport system 26 currently known in the art. For example, an external tractive means 33 may be used to pull the material through the press. Additionally, the material transport system 26 may be configured to force the material through the press by effectively pushing the material 38*b* into the press (not shown). Additionally, the material transport system may include structure that both push and pull (not shown) the material 38*b* through the press. These structures are well known in the art and as such, a detailed description is not included in this discussion.

In FIGS. 5 & 7, an alternative material transport system 26 is disclosed. More specifically, a belt or conveyor system 25 is shown. The conveyor system 25 is arranged to support and otherwise carry the material 38*b* through the oscillating pressing system. Suitable conveyor systems 25 are well known in the art, and as such are not discussed in detail in the present application. Those skilled in the art will appreciate that conveyor system 25 may be configured to substantially stop moving during the compression phase 44 and to move during the release phase 46. Alternatively, the conveyor system 25 may be substantially constantly moving throughout the compression phase 44 and the release phase 46.

An alternative material transport system 26 is derived from the motion of the oscillating motion of the platens 40*b*. More specifically, the motion of the platens 40*b* controls the transportation of the material 38*b* through the oscillating pressing system 20. As discussed above, and as is best illustrated in FIGS. 5 and 7, the compression vector angle 37 includes both a vertical motion component 41 and a lateral motion component 39.

An oscillating pressing system 20 having platens 40*b* engaging the material 38*b* at a compression vector angle 37 imparts a novel attribute to the present invention. More specifically, when the lateral motion component 39 of the platens 40*b* coincides with a compression phase 44, the lateral motion component 39 functions to transport the material 38*b* through the press. The material 38*b* is transported through the oscillating pressing system 20 a linear distance that is slightly less than the linear distance traveled by the platens 40*b* during the compression phase 44. This transportation occurs one time for each oscillating compression press cycle 34. Simultaneously, the vertical motion component 41 suitably compresses the material 38*b* while the material 38*b* is being transported. Accordingly, no other transportation structure, such as an external tractor means, is required to move the material 38*b* through the oscillating pressing system 20.

Figure 11:
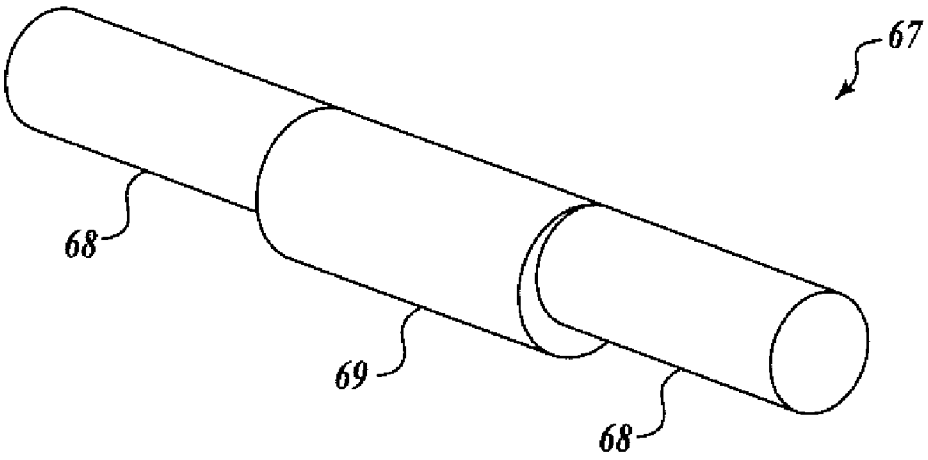
FIG. 11 is a perspective view of the eccentric shaft made in accordance with the present invention.

A manner in which to control the platen 40 motion to achieve an adequate compression vector angle 37 is to drive the platen 40 in a substantially circular motion. With specific reference to FIGS. 10 and 11, one presently preferred method of achieving the desired motion is to drive the platens 40*b* on an eccentric shaft 67, or similar structure. Such a structure will create substantially circular oscillating motion of the platens 40*b* sufficient to proved transportation and oscillating compression of the material 38*b* through the oscillating pressing system 20.

In a presently preferred embodiment, the platens 40*b* are each arranged with at least one bore 47 suitably arranged to receive an eccentric shaft 67. In a particular embodiment, each platen 40 is configured with three bores 47, each being suitably arranged to receive an eccentric shaft 67. The eccentric shaft 67 includes a journal region 68 and a lobed region 69. The journal region 68 is in communication with a drive mechanism 27 via gearing, belt or direct drive means (not shown). The lobed region 69 is configured to remain substantially internal of the platens 40*b* and drive them in a substantially circular motion. The lobed region 69 is preferably sufficiently large enough to create enough of a relief region 43 such that material 38*b* is not moved in an undesired direction. It is to be noted, however, that although any given point of the platens 40*b* will transcribe a substantially circular path, the opposed surfaces of the platens remain parallel to one another at all times.

Figure 1:
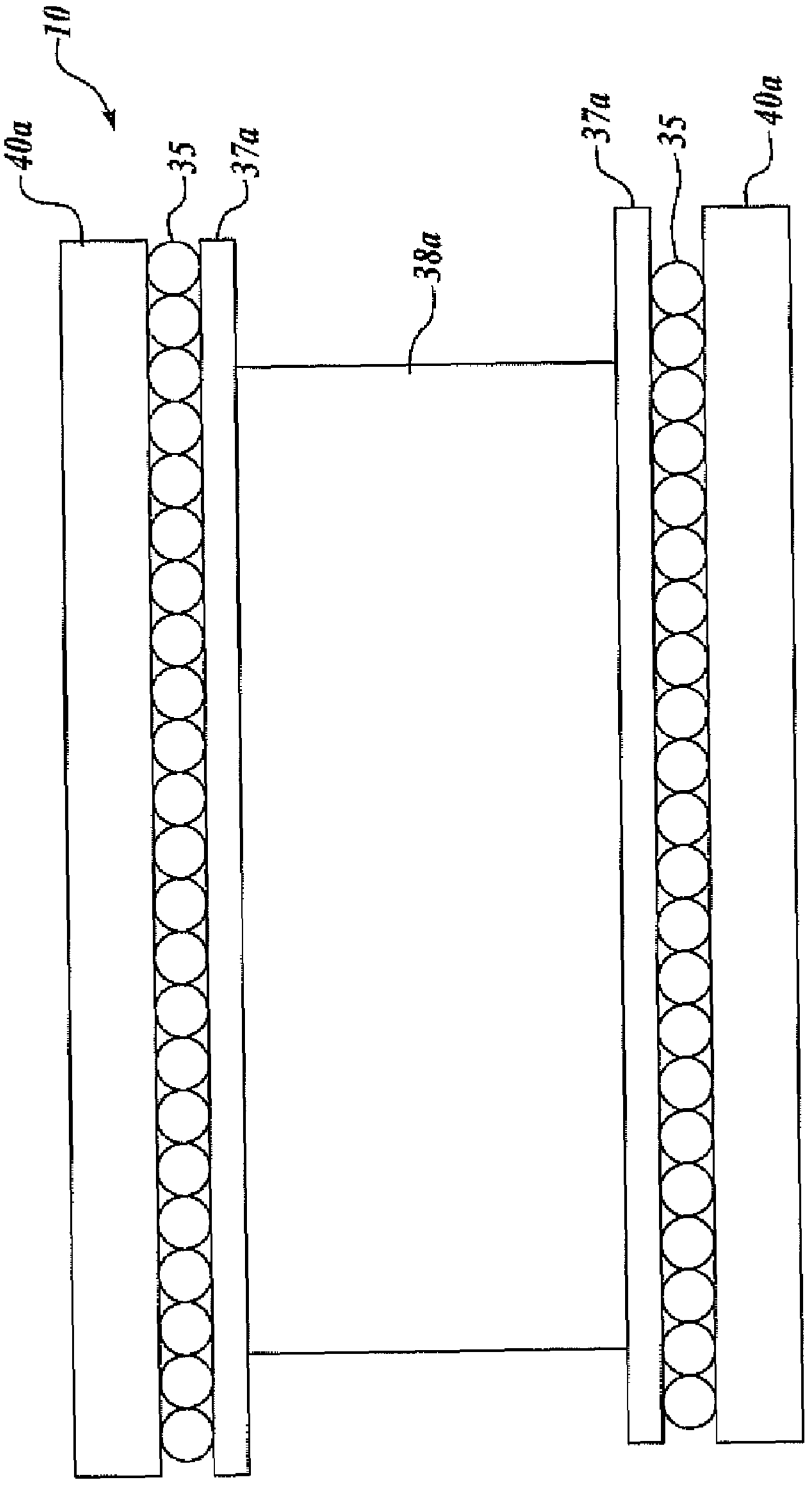
FIG.1 (PRIOR ART)
FIG. 1 is a schematic of a press section according to the prior art.
Figure 2:
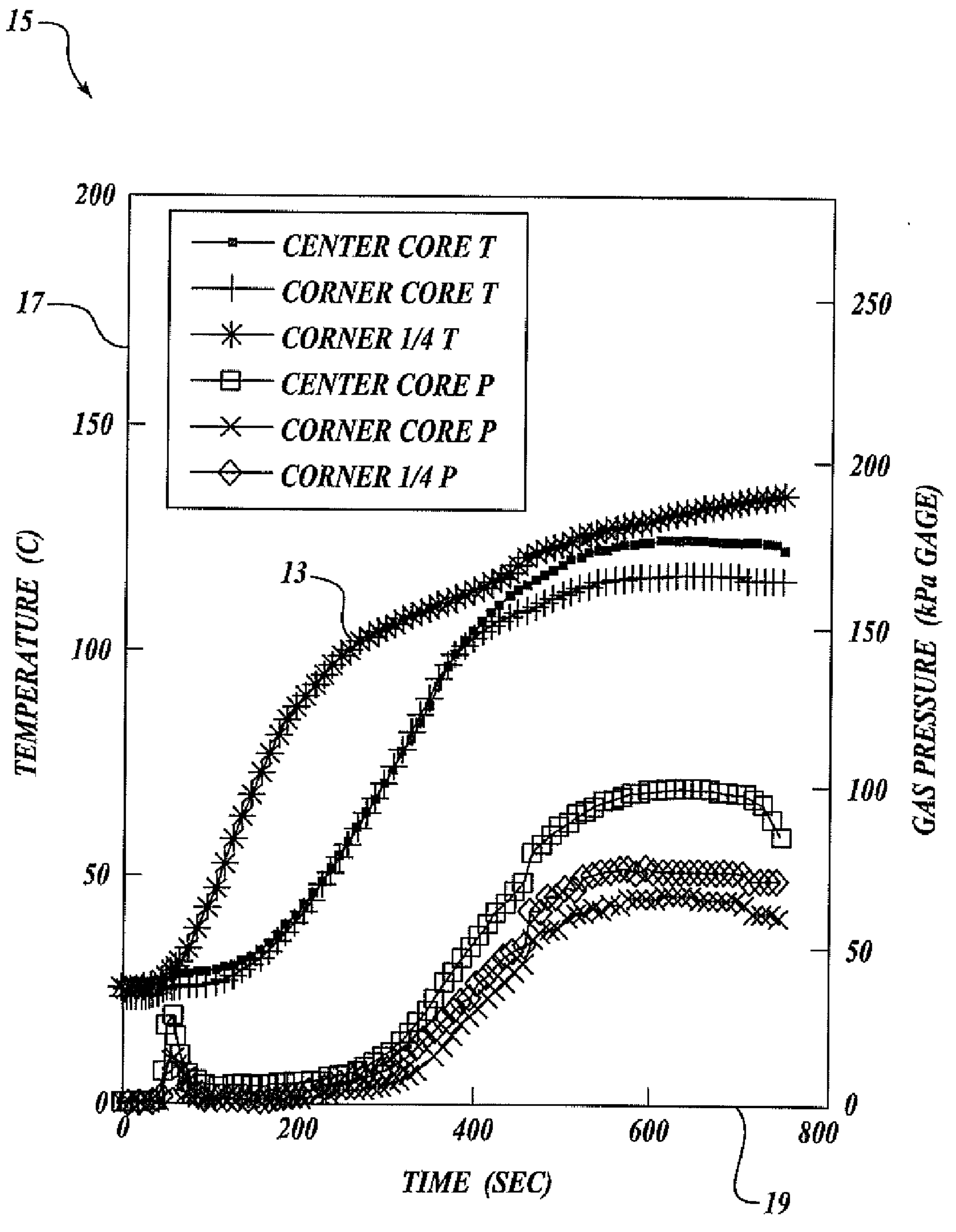
FIG. 2 (PRIOR ART)
FIG. 2 is a graph depicting material temperature and pressure characteristics according to the prior art.
Figure 3:
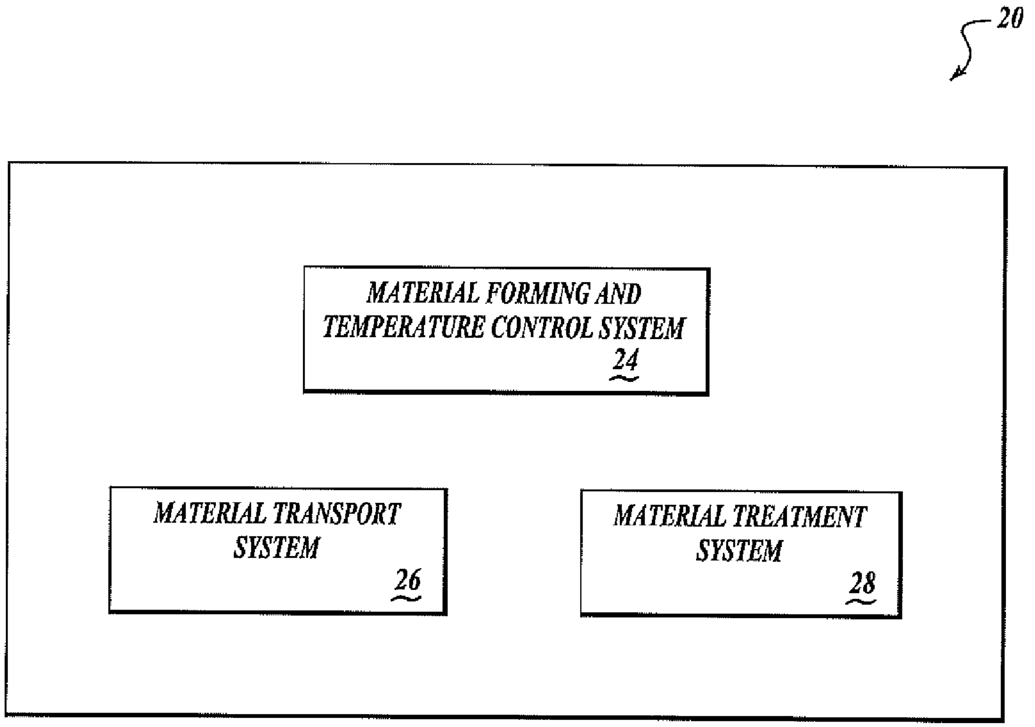
FIG. 3 is a system diagram of the oscillating compression pressing process according to an embodiment of the present invention.

With specific reference to FIGS. 3 and 10, an optional material treatment system 28 is preferably configured to treat the material 38*b* while the material 38*b* is within the oscillating pressing system 20. The material treatment system 28 includes the addition suitable dyes or colorant materials, fire retardant materials, or preservative materials. However, the nature of the product added by the material treatment system 28 is not intended to limit the scope of the present invention. Consequently, any suitable product may be introduced by the material treatment system 28.

A material treatment unit 52 is suitably configured to control introduction of any treatment product. The form of the material treatment unit 52 is not intended to limit the present invention. Thus, any known structure may be used as a material treatment unit 52. For example, the material treatment unit may be a reservoir with suitable pumps, metering devices, sensing devices etc. commonly used with the temporary storage and disposition of the various treatment products according to this invention.

The material treatment unit 52 suitably includes any structure necessary to enable the material treatment unit 52 to function as it is intended. For example, the material treatment unit 52 includes any hose, conduit, nozzle, diffuser or pathway utilized by the material treatment unit 52 in the delivery of the treatment product to the material 38*b*.

In a presently preferred embodiment the material treatment system 28 is configured to introduce the product onto the material 38*b* within the oscillating pressing system 20 during the release phase 46. However, the material treatment system 28 may be configured to introduce the product before, during or after the material is within the compression section of the oscillating pressing system 20.

Figure 12:
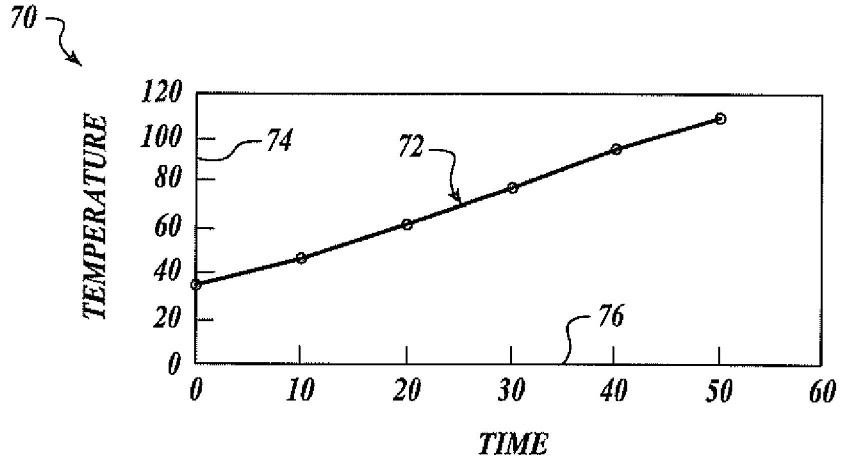
FIG. 12 is a temperature graph illustrating material temperature formed according to an aspect of the present invention.

Control of the material forming and temperature control system 24 as discussed above dictate the overall heating of material 38*b*. FIG. 12 is a first graph 70 depicting experimental data relating material temperature on the Y-axis 74 and time on the X-axis 76. A billet temperature curve 72 illustrates the increase in material 38*b* over time as the material 38*b* is subjected to the present invention. The billet was a 1.5-inch assembly of laminated veneer lumber. The linear speed through the press was 12 inches per minute. The press was operating at a frequency of about 40 Hz.

Figure 13:
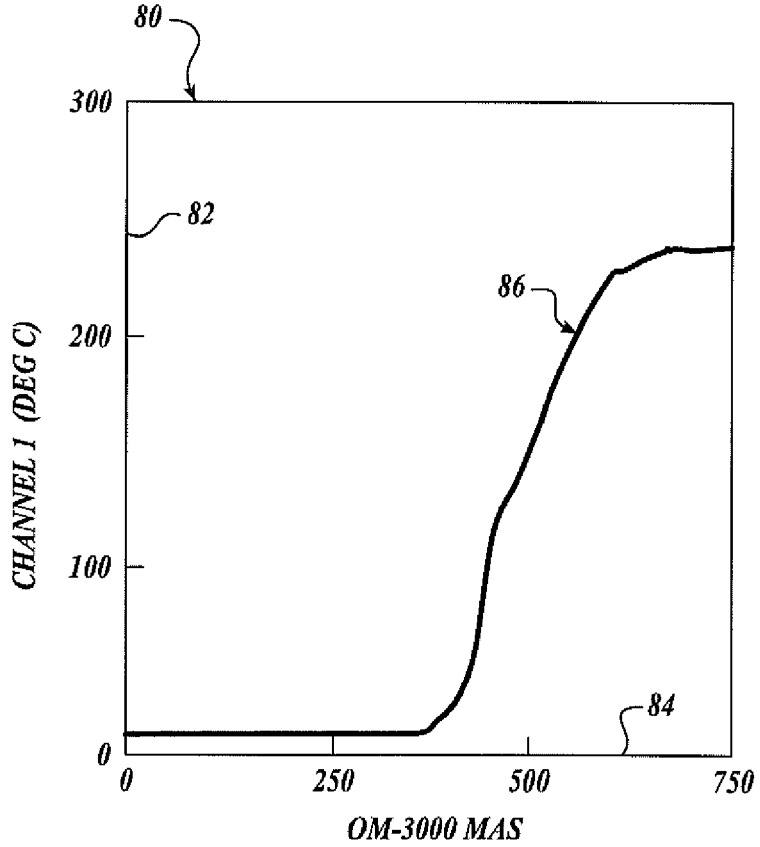
FIG. 13 is another graph illustrating material temperature formed over time according to an aspect of the present invention.
Figure 14:
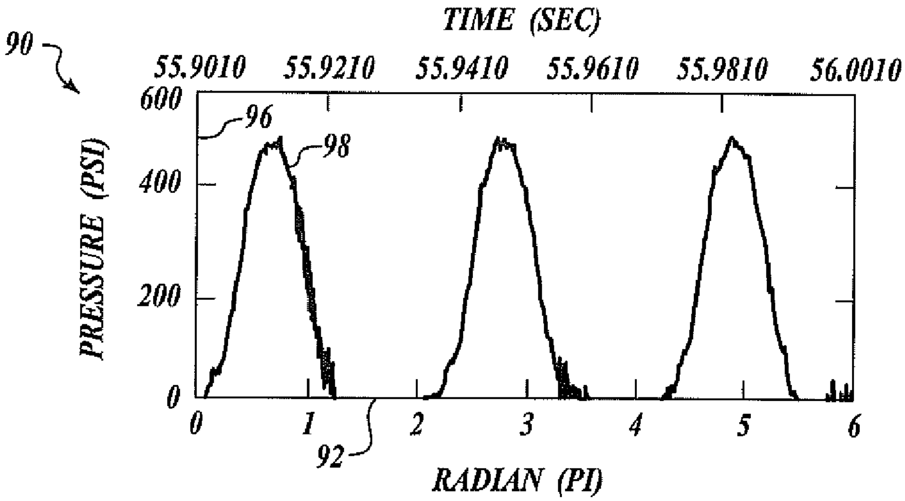
FIG. 14 is a graph illustrating material pressure variations due to oscillation compression resulting from an aspect of the present invention; and, FIG. 15 is another graph illustrating material temperature formed over time according to an aspect of the present invention.

FIGS. 13 and 14 illustrate a second graph 80 and a third graph 90, respectively, depicting the results of another experiment conducted according to the present invention. Both the second graph 80 and the third graph 90 reflect data taken from the same experiment. The experiment used 0.035 inch Aspen strands having about a 4% moisture content formed into a mat assembly with a row density of about 25 $lbs/ft^3$ to about 42 $lbs/ft^3$. The mat assembly did not include resin, wax or other additives. The oscillating compression press was oscillating at a frequency of 30 Hz and had a linear mat speed through the press of 0.6 feet/minute.

The second graph 80 relates temperature in degrees Celsius on the Y-axis 82 and time in seconds on the X-axis. Curve 86 illustrates the internal temperature of the mat assembly 30 as it passes through the compressed material forming system 20.

The third graph 90 depicts the internal pressure variations within the material 38*b* due to the oscillating compression of the present invention. The X-axis 92 represents the rotation position of the eccentric shaft in radians. Also, an upper X-axis 94 represents time in seconds. The Y-axis indicates internal pressure in $pounds/in^2$. Curve 98 depicts the condition of the material 38*b* relative to the variables displayed on the third graph. Specifically, internal pressure variations of the material 38*b* are shown as the oscillating compression press moves through multiple press cycles 34. For this experiment, the strain gage was located in the high-pressure zone of the press.

Figure 15:
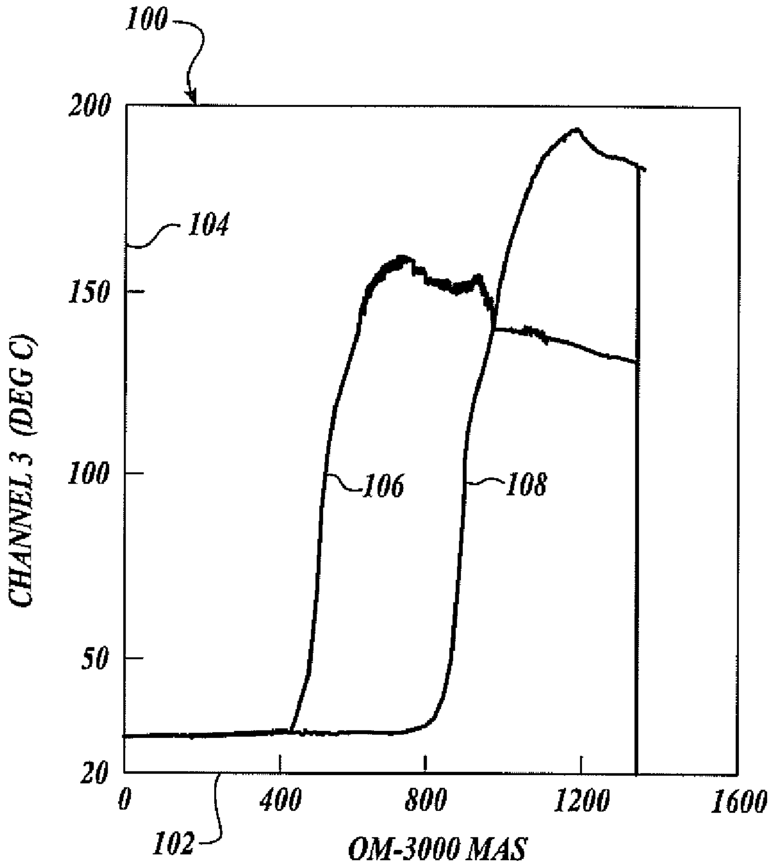

FIG. 15 is a fourth graph 100 relating material 38*b* temperature on the Y-axis 104 to time in seconds on the X-axis. Curve 106 and curve 108 reflect the material 38*b* temperature at a given time as the material 38*b* advances through the oscillating compression press. Curve 106 and curve 108 show data taken from thermal couples placed within the material 38*b* along the material direction 50.

The experiment reflected in FIG. 15 used yellow-popular strands 0.050 inches in length with an initial moisture content of about 3%. The strands were resinated with liquid phenol formaldehyde at 5% concentration, solid phenol formaldehyde at 3% and about 2% slack wax. The linear speed of the material was 1 inch/minute and the frequency was 30 Hz. The target product density was 40 pounds/ft$^3$.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of forming a compressed composite wood product, comprising:

introducing a mat assembly of resinated discrete wood elements into an oscillating compression press; and controlling oscillation compression of the press such that cycling between a compression phase and a release phase serves to heat the mat assembly to at least a cure temperature of the resin.

2. The method of claim 1, wherein controlling oscillation compression includes controlling the stroke of the oscillating compression press.

3. The method of claim 1, wherein controlling oscillation compression further includes plasticizing the mat assembly.

4. The method of claim 1, wherein controlling oscillation compression includes controlling the frequency of the oscillating compression press.

5. The method of claim 4, wherein the oscillation frequency occurs at a frequency of about 1 Hz to about 400 Hz.

6. The method of claim 1, wherein controlling the oscillation compression includes controlling a compression stroke ratio.

7. The method of claim 6, wherein the oscillution compression is between about 0.01 and 0.5.

8. The method of claim 1, wherein the material is a mat assembly of resinated discrete wood elements.

9. The method of claim 1, wherein the wood element is at least one of a chip, flake, strand, veneer, fiber, particle and wafer.

10. The method of claim 1, wherein the compressed composite wood product is at least one of an oriented strand board, plywood, oriented strand lumber, oriented veneer lumber, fiber board, wafer board and laminated beam.

11. A method of forming a compressed composite wood product, comprising:

introducing a mat assembly of resinated discrete wood elements into a press having one or more platens on opposing sides of the mat asssembly; and moving the platens in a substantially circular motion such that cycling between compressing the mat assembly and releasing the mat assembly serves to heat the mat assembly to at least a cure temperature of the resin.

12. The method of claim 11 wherein the circular motion compriscs a vertical component of motion and a lateral component of motion.

13. The method of claim 11 wherein the mat assembly is heated by a compounding energy deposition resulting from a hysteresis energy loss from cycling between compressing the mat assembly and releasing the mat assembly.

14. The method of claim 11 wherein when the platens release the mat assembly they move at a rate that is faster than a rate at which the mat assembly is expanding.

15. The method of claim 11 wherein at least one of the wood elements is at least one of a chip, flake, strand, veneer, fiber, particle and wafer.

* * * * *